Nov. 22, 1927.
J. D. CUMMINGS
1,650,329
WINCH ATTACHMENT FOR TRACTORS
Filed April 5, 1926
3 Sheets-Sheet 1
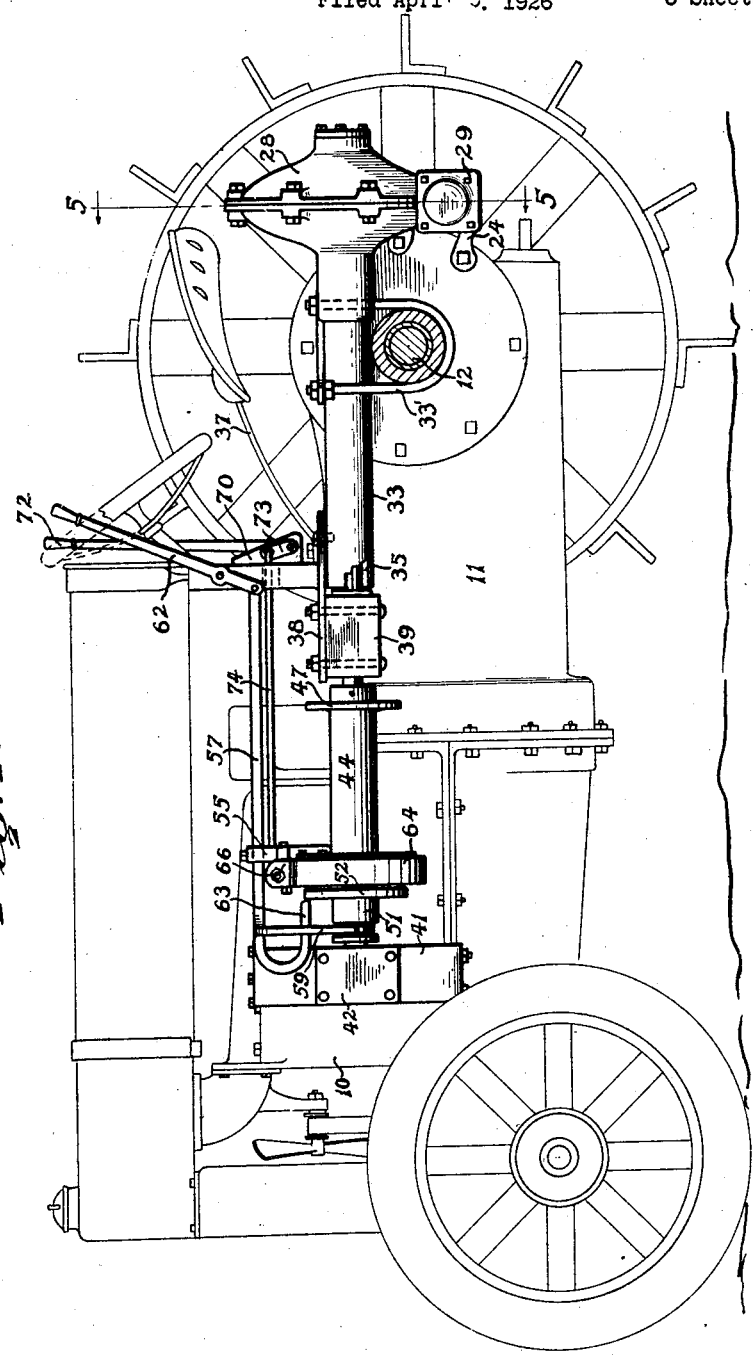
Inventor
J. D. Cummings.
By Lacy & Lacy, Attorneys

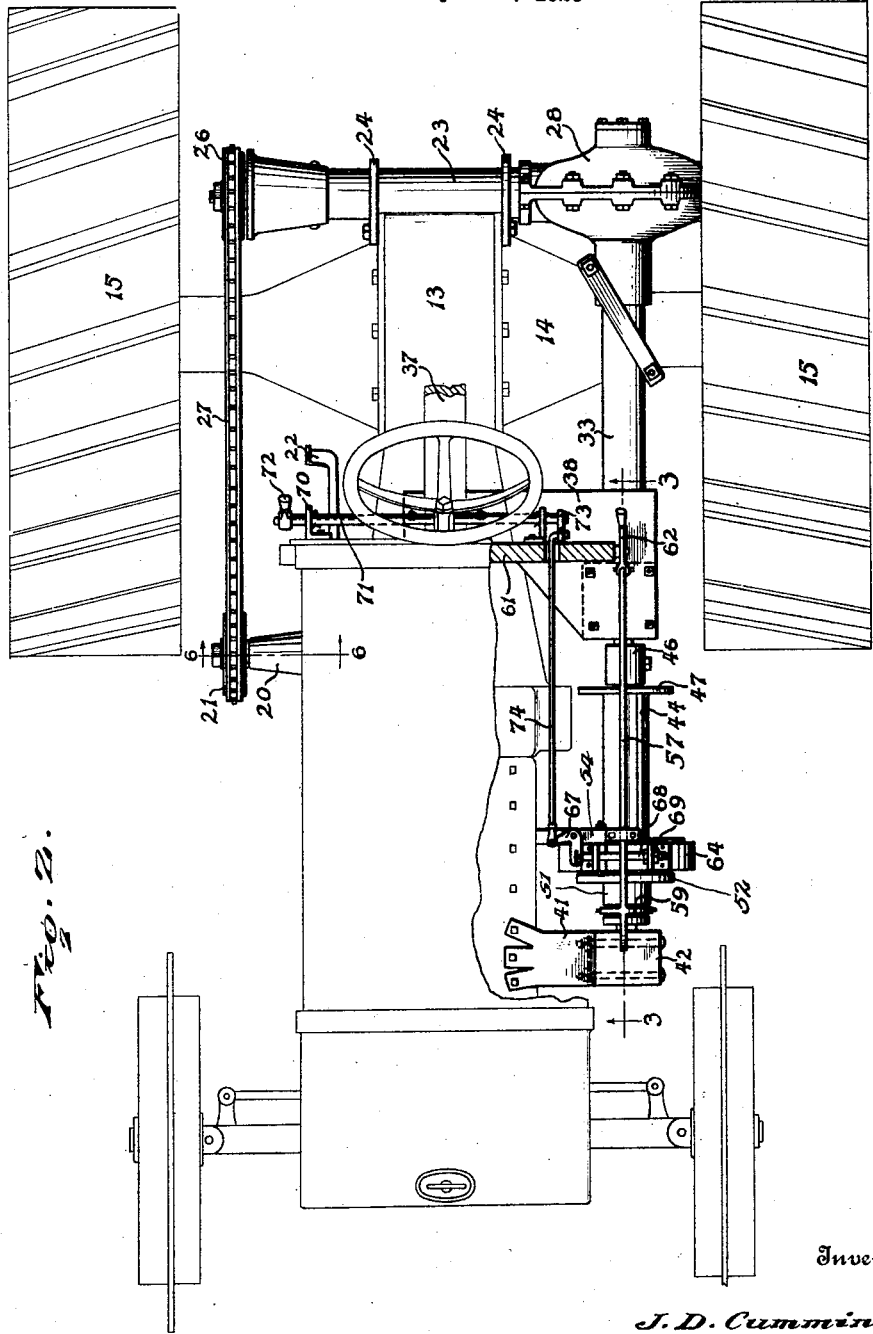

Nov. 22, 1927.
J. D. CUMMINGS
1,650,329
WINCH ATTACHMENT FOR TRACTORS
Filed April 8, 1925   3 Sheets-Sheet 3
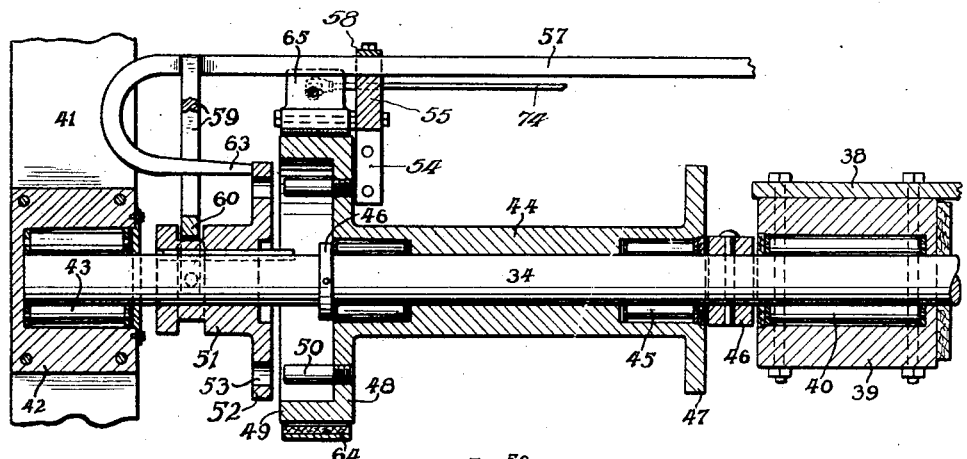
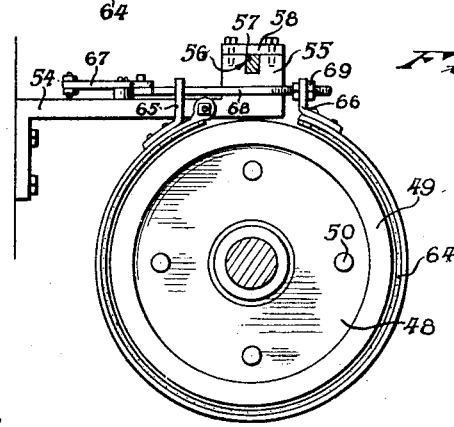
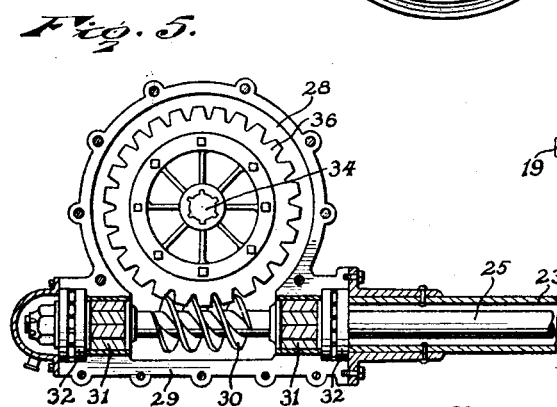
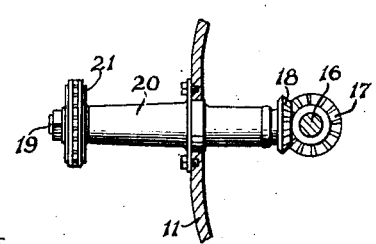
Inventor
J. D. Cummings.
By
Lacy & Lacy, Attorneys Patented Nov. 22, 1927.

1,650,329

UNITED STATES PATENT OFFICE.

JAMES D. CUMMINGS, OF EL CAMPO, TEXAS.

WINCH ATTACHMENT FOR TRACTORS.

Application filed April 8, 1926. Serial No. 100,673.

This invention relates to an improved winch attachment for tractors, being more especially designed for use in conection with Fordson tractors, and seeks, among other objects, to provide a winch which may be readily mounted upon such a tractor and operated by the power plant of the tractor.

The invention seeks, as a further object, to provide a winch wherein the usual power take-off of the tractor will be employed for driving the winch, and wherein structural change in the tractor will be unnecessary in order to apply the winch to the tractor.

Another object of the invention is to provide a winch which will embody a worm drive and wherein a clutch separate and distinct from the clutch of the tractor will be provided for controlling the rotation of the winding drum.

And the invention seeks, as a still further object, to provide means for effectually braking the drum.

Other objects of the invention not specifically mentioned in the foregoing will appear during the course of the following description.

In the accompanying drawings:

Figure 1 is a sectional view showing my improved winch applied to a Fordson tractor, the winch mechanism being illustrated in elevation.

Figure 2 is a plan view particularly showing the parts for operating the brake as well as the shifter bar of the clutch of the winding drum.

Figure 3 is an enlarged sectional view on the line 3—3 of Figure 2, looking in the direction indicated by the arrows, this view particularly showing the winding drum and associated parts.

Figure 4 is a detail sectional view particularly showing the brake.

Figure 5 is a detail sectional view particularly showing the worm wheel.

Figure 6 is a detail sectional view on the line 6—6 of Figure 2, looking in the direction indicated by the arrows, and particularly showing the power take-off.

As previously intimated, the winch of the present invention is more especially designed for use in connection with Fordson tractors and I have accordingly shown the present improvements in conjunction with such a tractor. The engine of the tractor is generally indicated at 10. The transmission case at 11, the rear axle shaft at 12, the differential housing at 13, and the rear axle housings at 14, while the rear wheels of the tractor are indicated at 15. A detailed description of the mechanism of the tractor would seem unnecessary to a thorough understanding of the present improvements. However, it should be noted that the transmission of the tractor includes a transmission drive shaft 16 which, as shown in Figure 6, carries a gear 17, and meshing with said gear is a gear 18 on a power take-off shaft 19. The shaft 19 is journaled through a housing 20 which is bolted to the transmission case of the tractor and, for the purposes of the present invention, said shaft is equipped at its outer end with a sprocket 21. The usual clutch of the tractor, which clutch however, is not shown, is mounted at the forward end of the shaft 16 and is controlled by the usual clutch pedal 22 depressible for releasing the clutch and disconnecting the engine from the shaft 16. However, as will be appreciated, by placing the transmission of the tractor in neutral, the shaft 16 may be driven by the tractor engine for driving the shaft 19 while the tractor is at rest.

Extending in parallel relation to the rear axle of the tractor at the rear thereof is a tubular housing 23, and straddling said housing are U-shaped brackets 24 secured at their ends to the differential housing 13 by pairs of the same bolts which are employed to connect the axle housings 14 with the differential housing. The housing 23 is thus rigidly mounted at the rear of the rear axle, and journaled through said housing, as seen in Figure 5, is a worm shaft 25. Fixed to said shaft at one end of the housing is a sprocket 26, and trained around said sprocket and around the sprocket 21 of the power take-off shaft 19 is a sprocket chain 27. Accordingly, when the power take-off shaft is rotated, the worm shaft 25 will be driven thereby.

Fixed to the end of the housing 23 opposite the sprocket 26 is a worm gear casing 28 having a tubular portion 29 alining with the housing 23, the casing 28 being, as shown, preferably formed of mating detachably connected sections. As shown in Figure 5, the shaft 25 extends into the tubular portion 29 of the casing and is provided with a worm 30, and journaling the shaft at the ends of the worm are roller bearings 31, while thrust bearings 32 are also provided for limiting the shaft against endwise movement. Extending forwardly from the casing 28 is a tubular housing 33, secured to the adjacent axle housing 14 of the tractor by a U-bolt 33', and extending through the housing 33 is a drum shaft 34 journaled, as shown in Figure 1, by a roller bearing 35 at the forward end of such housing. Fixed to the shaft 34 within the casing 28 is a worm wheel 36 meshing with the worm 30 so that, as will be seen, when the shaft 25 is rotated, the drum shaft 34 will be driven thereby. Bolted at its inner end beneath the forward end of the usual seat spring 37 of the tractor is a laterally projecting arm 38, and bolted to said arm at its lower side, as best seen in Figure 3, is a bearing block 39 mounting a roller bearing 40 which journals the shaft 34 adjacent the forward end of the housing 33. Bolted at one end to the head of the engine 10 and at its opposite end to the base flange of the engine block, as particularly seen in Figures 1 and 2, is a bracket 41, and bolted to said bracket is a bearing block 42 in which is mounted a roller bearing 43 journaling the shaft 34 at its forward end. The forward end portion of said shaft which projects from the housing 33 is thus rigidly connected with the tractor by the arm 38 and bracket 41 while the bearings 40 and 43 will effectually journal such portion of the shaft. Preferably, the usual bolts which connect the seat spring 37 with the tractor are employed for anchoring the arm 38. Similarly, the usual engine head bolts of the tractor engine are employed for anchoring the bracket 41 at its upper end while the usual crank case bolts are employed for anchoring said bracket at its lower end.

Freely mounted upon the forward end portion of the shaft 34 between the bearing blocks 39 and 42 is a winding drum 44 and countersunk in the ends of said drum are roller bearings 45 journaling the drum upon the shaft, collars 46 being secured on the shaft at the ends of the drum for limiting the drum against endwise movement. The drum is formed with end plates 47 and 48, and formed on the latter plate at its periphery is an annular forwardly directed brake flange 49. Screwed through or otherwise fixed to the end plate 48 of the drum are spaced clutch pins 50, and splined on the shaft 34 is a clutch member 51 having an end plate 52 movable within the brake flange 49 and provided with apertures 53 to accommodate the pins 50 for coupling the drum with the shaft 34.

Bolted at one end to the engine block of the tractor, as particularly seen in Figure 4, is a bracket 54 provided at its outer end with an upstanding head 55 in which is formed a notch 56, and slidable in said notch is a shifter bar 57 held in the notch by a cap plate 58 bolted to the head. Near its forward end, the bar 57 is formed with downwardly divergent fork arms 59, and pivoted between the lower ends of said arms is a collar 60 fitting in a suitable groove in the hub of the clutch member 51. Accordingly, as will be seen, the bar 57 may be moved longitudinally for shifting said clutch member into and out of engagement with the pins 50 of the drum 44, and mounted to rock upon the dash 61 of the tractor, at the adjacent side edge of said dash, is a hand lever 62 pivotally connected with the rear end of the bar so that the hand lever may be manually swung for shifting the bar and actuating the clutch member. Forwardly of the fork arms 59, the bar 57 is, as best seen in Figure 3, curved downwardly and rearwardly to form an arm 63 extending between said fork arms to coact at its free end with the peripheral margin of the plate 52 of the clutch member 51. Thus, when the bar 57 is shifted rearwardly, the arm 63 will press against said plate and assist the fork arms 59 in shifting the clutch member into engagement with the pins 50 of the drum so that possible fracture of said fork arms will be prevented.

Bolted at one end to the bracket 54, as seen in Figure 4, is a resilient brake strap 64 encircling the flange 49 of the drum 44, and secured to the adjacent end of said strap is an upstanding ear 65 while to the opposite end of the strap is fixed a similar ear 66. Mounted to rock upon the bracket is a bell crank 67, and secured to one arm of said bell crank is a rod 68 which extends freely through the ear 65 of the brake strap and is adjustably connected to the ear 66 thereof by nuts 69. Fixed to the dash 61 of the tractor are transversely spaced brackets 70 through which is journaled a shaft 71, and fixed to one end of said shaft is a hand lever 72. Fixed to the opposite end of said shaft is a lever 73, and extending between said lever and the inwardly directed arm of the bell crank 67 is a rod 74. Thus, as will be seen, the hand lever 72 may be rocked for tightening the brake strap 64 about the flange 49 of the drum 44 and braking the drum.

In use, the drum 44 carries a suitable cable so that, as will now be seen, by rocking the hand lever 62 to shift the bar 57 rearwardly, the drum may be coupled with the shaft 34 whereupon said drum will be driven by the tractor engine for winding the cable upon the drum. During this operation the tractor is, of course, maintained stationary to which end the transmission of the tractor is previously placed in neutral and, as will be appreciated in view of the foregoing description, the winding of the cable upon the drum 44 may be controlled by manipulation of the clutch pedal 22 of the tractor to effect the driving of the power take-off shaft 19. As long as the clutch member 51 remains engaged with the pins 50 of the drum 44 so that the drum is coupled to the shaft 34, the worm gear 36 will coact with the worm 30 for locking the drum against counter-rotation and preventing unwinding of the cable. However, the cable may be freely unwound by shifting the hand lever 62 to disengage the drum from the shaft 34, and the hand lever 72 may be manipulated for braking the drum and controlling the counter-rotation thereof.

Having thus described the invention, what I claim is:

1. An attachment for motor tractors which includes a clutch controlled power take-off shaft at one side driven by the tractor motor, said attachment comprising a shaft extending transversely of the tractor and driven by said first mentioned shaft, means for mounting said transverse shaft on the rear end of the tractor, a drum shaft extending longitudinally of the tractor at the side thereof opposite the take-off shaft and driven by said transverse shaft, means for mounting the drum shaft on the side of the tractor, a winding drum free on the drum shaft near the front end thereof, and a manually operable clutch for coupling the drum with said drum shaft to be turned thereby.

2. The combination with a motor tractor having a clutch controlled power take-off shaft driven by the tractor motor, of a shaft extending transversely of the tractor, a driving connection between said shafts, a housing for the latter shaft, brackets rigidly connecting said housing with the tractor, a drum shaft extending toward the forward end of the tractor and driven by said second mentioned shaft, a housing enclosing a portion of said drum shaft, means rigidly connecting the latter housing with the tractor, a winding drum free on the forward end portion of said drum shaft, and a manually operable clutch for coupling the drum with said drum shaft to be turned thereby.

3. An attachment for motor tractors which include a clutch controlled power take-off shaft driven by the tractor motor, said attachment comprising a drum shaft extending longitudinally at one side of the tractor, a driving connection between said shafts supported on the rear portion of the tractor frame for rotating the drum shaft, a winding drum free on the drum shaft, a clutch member mounted to turn with the drum shaft and shiftable thereon to engage the drum for coupling the drum with the drum shaft, a bracket projecting from the tractor adjacent the drum, a shifter bar slidably supported by said bracket and operatively engaging said clutch member, a brake strap anchored at one end to said bracket and disposed to cooperate with the drum, and manually operable means including an element mounted on said bracket connected with the opposite end of said strap for tightening the strap about the drum and braking the drum.

4. An attachment for motor tractors which include a power take-off shaft on one side of the tractor, said attachment comprising a casing secured transversely to the rear end of the tractor, a transmission shaft mounted in said casing and driven by the power take-off shaft, a longitudinal housing rigidly supported on the tractor on the side thereof opposite the power take-off shaft, a drum shaft journaled in said housing and extending forwardly beyond the same, gearing connecting the rear end of the drum shaft with the transmission shaft, a drum loose on the front end portion of the drum shaft, a clutch keyed to the drum shaft adjacent the front end of the drum, and a shifting bar for moving the clutch into and out of engagement with the drum, said bar having a fork engaged with the hub of the clutch and a rearwardly projecting arm bearing against the side of the clutch adjacent the margin of the same.

In testimony whereof I affix my signature.

JAMES D. CUMMINGS. [L. S.]